Figure 1:
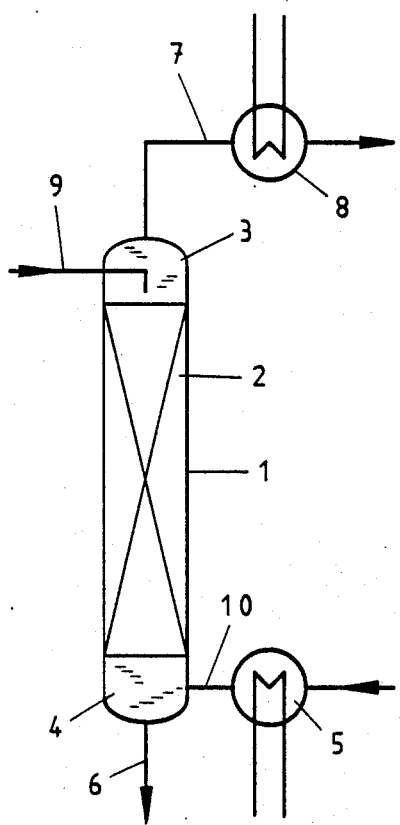

United States Patent [19]

Altorfer

[11] Patent Number: 4,658,012

[45] Date of Patent: Apr. 14, 1987

[54] PROCESS FOR PURIFYING CHLORINATED ALIPHATIC POLYMERS

[75] Inventor: Alfred Altorfer, Freienstein, Switzerland

[73] Assignee: Sulzer Brothers Limited, Winterthur, Switzerland

[21] Appl. No.: 849,687

[22] Filed: Apr. 9, 1986

[30] Foreign Application Priority Data

May 6, 1985 [CH] Switzerland ............................ 1903/85

[51] Int. Cl.$^4$ ................................................. C08F 6/10
[52] U.S. Cl. .................................................... 528/497
[58] Field of Search .......................... 528/493, 497, 498

[56] References Cited

U.S. PATENT DOCUMENTS 4,147,859 4/1979 Davis .................................... 528/498
4,381,392 4/1983 Pontoglio ............................ 528/498

Primary Examiner—Paul R. Michl
Attorney, Agent, or Firm—Kenyon & Kenyon

[57] ABSTRACT

A descending flow of chlorinated aliphatic polymer is continuously contacted with a second solvent having a higher boiling point than the chlorination solvent to effect a solvent exchange. The polymer to be purified is delivered into the head of the exchange column while the second solvent, for example, xylene, is directed into the sump of the exchange column.

7 Claims, 2 Drawing Figures

PROCESS FOR PURIFYING CHLORINATED ALIPHATIC POLYMERS

This invention relates to a process for purifying chlorinated aliphatic polymers. More particularly, this invention relates to a process for purifying chlorinated aliphatic polymers of chlorination solvents by a solvent exchange with a second solvent having a higher boiling point than the chlorination solvent.

As is known, aliphatic polymers, as for example natural rubber, polyisoprene, polybutadiene, polyethylene, polypropylene and copolymers, are chlorinated by dissolving the polymers in a chlorine-resistant solvent such as tetrachloromethane ($CCL_4$), chloroform, trichloroethylene or tetrachloroethane and reacting with chlorine in a suitable manner. However, in order to use chlorinated polymers for example in paints, printing inks or adhesives, the chlorination solvents, some of which are very toxic, must, for health reasons, be removed as completely as possible and replaced by other solvents.

Heretofore, various types of procedures have been known for removing the chlorination solvent. For example, French Patent No. 1,424,790 describes a process in which a solvent exchange is made between the chlorination solvent and a second solvent which has a higher boiling point than the chlorination solvent. As described, a solution of the chlorinated aliphatic polymmer and the second solvent are mixed and placed as separate charges in a sump of a fractionating column. Thereafter, the chlorination solvent and parts of the second solvent are described as being fractionally distilled until the remaining solution of the chlorinated polymer in the second solvent is depleted of chlorination solvent to the required extent. While this technique would avoid the known preceding isolation of the chlorinated polymers, the cost of energy and apparatus would be relatively high since at least a part of the distilled solvents occurs as a mixture and must be processed again. Furthermore, because of the long residence time in the sump of the fractionating column, the intermittent operation which is unavoidable for the required purification results in a high thermal stress of the chlorinated product.

Accordingly, it is an object of the invention to free chlorinated polymers from chlorination solvent in a relatively simple and economical manner.

It is another object of the invention to remove chlorination solvent from a chlorinated aliphatic polymer in a gentle manner.

It is another object of the invention to remove chlorination solvent from a chlorinated aliphatic polymer at a relatively low energy cost and financial cost.

Briefly, the invention provides a process for removing chlorination solvent from a chlorinated aliphatic polymer which comprises the steps of continuously contacting a descending flow of a chlorinated aliphatic polymer containing a chlorination solvent with an ascending flow of a second solvent having a higher boiling point than the chlorination solvent within continuously operating exchange column in order to effect a solvent exchange.

In this process, a flow of chlorinated aliphatic polymer containing the chlorination solvent is delivered into a head of the continuously operating exchange column. In addition, a flow of the second solvent is delivered into a sump of the exchange column. The solvent exchange takes place in the "steps" of the exchange column between the downward flowing liquid chlorination solution and the vaporous second solvent flowing in the opposite direction. With an adequate number of steps in the column, a complete solvent exchange is obtained in one "pass", so that the process can operate in continuous fashion. Of note, the solvent exchange in the column can occur intermittently in a column with individual bottoms or continuously in a column with packing elements.

The continuous operation results in short residence times of the product in the column. Any additional expense for the separation of solvent mixture occurring as a head product is thus eliminated as well.

If relatively large amounts of chlorine and hydrogen chloride are present in the chlorination solution, these impurities distil out immediately with the chlorination solvent. Danger of a reaction with the second solvent is not likely to exist. In the process, therefore, the chlorination solution need not be expressly pre-purified from chlorine and hydrogen chloride. The attainable purity from residues of chlorination solvent in the product is a matter of expenditure, for example a matter of the number of "separation steps" in the exchange column.

The second solvent may be selected from e.g. esters, ketones or solvents with aromatic structures, as e.g. toluene or xylene, with boiling temperatures at atmospheric pressure of at most 180° C., but which boil at temperatures higher than the chlorination solvent employed.

Toluene and xylene are especially advantageous as the second solvent. That is, when these solvents are used, no new components are introduced into the system, since toluene serves as a solvent for example in printing inks, while xylene is used mainly in paint systems in shipbuilding and steel or cement construction.

An especially gentle treatment of the chlorinated polymer product is obtained if the second solvent is evaporated in a separate evaporator before being fed into the exchange column.

Figure 2:
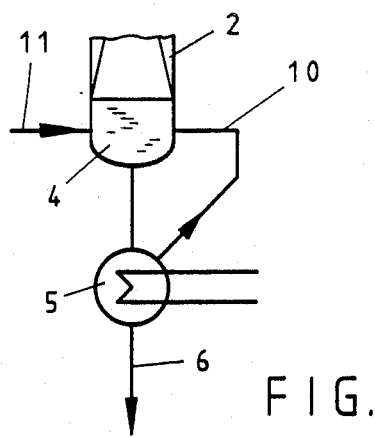

These and other objects and advantages of the invention will become more apparent from the following detailed description taken in conjunction with the accompanying drawings wherein:

FIG. 1 schematically illustrates a system employing the process of the invention; and FIG. 2 illustrates a modified system in accordance with the invention.

Referring to FIG. 1, the system includes a vapor/liquid exchange column 1 which is provided in known manner with inserts 2 for a substance exchange. These inserts 2 may be packing or filling bodies as used commercially for continuous solvent exchange while, for intermittent conduction of the process, the inserts consist of individual exchange bottoms.

As illustrated, the exchange column 1 has a head 3 at the upper end and a sump 4 at the lower end or bottom. In addition, a feed line 9 communicates with the head 3 of the column 1 in order to deliver a flow of chlorinated aliphatic polymer containing a chlorination solvent. For example, a chlorination solution containing chlorinated rubber and a chlorination solvent such as tetrachloromethane, $CCL_4$, is delivered via the feed pipe 9.

A conduit 10 is connected to the sump 4 of the column 1 in order to deliver a flow of a second solvent having a higher boiling point than the chlorination solvent into the sump 4. As indicated, an evaporator 5 is connected to the conduit 10 in order to heat the second solvent prior to delivery into the sump 4. For example, a liquid flow of xylene or toluene can be fed into the evaporator so as to be heated into a vaporous state and thereafter charged in this form into the sump 4 via the conduit 10.

The evaporator 5 may be heated by any suitable heat source (not shown) or any other suitable solvent vapor generator may be used. Of note, separation of the evaporator 5 from the exchange column 1 has the advantage that the evaporation is completedly separated from the sump 4 containing dissolved product. This results in a gentle treatment of the product which is dissolved in the second solvent within the sump 4.

A discharge conduit 6 is connected to the sump 4 in order to extract product from the sump 4.

A discharge conduit 7 is connected to the head 3 of the exchange column 1 in order to carry off head product which consists essentially of chlorination solvent and, possibly, chlorine, hydrogen chloride or traces of the second solvent as impurities. The conduit 7 may also connect with a condenser 8 which may lead to a vacuum pump (not shown). The vacuum pump serves to produce and maintain a head pressure in the column 1. The condensation from the head product which is obtained in the condenser 8 is, for example, returned into the chlorination process.

During operation, a flow of chlorinated aliphatic polymer containing a chlorination solvent is delivered into the head 3 of the continuously operating exchange column 1 while a flow of the second solvent is delivered into the sump 4 in vaporous form. The descending flow of the chlorinated aliphatic polymer is thus contacted with the ascending vaporous flow of the second solvent within the inserts 2 of the column in order to effect a solvent exchange. In this respect, the descending flow may trickle down through the inserts 2 while the vaporous solvent flows through the inserts 2.

The resulting solution of chlorinated aliphatic polymer in the second solvent is then extracted from the sump 4 at the bottom of the exchange column 1 via the conduit 6. The further isolation from the product from the extracted solution may occur, if desired, by one of the known methods, for example by evaporation of the solution and subsequent drying of the product or by a steam treatment.

During the process, there is an immediate separation of the chlorination solvents during which the corrosive impurities pass into the head product. This provides a considerable simplification of the required equipment since a large part of the equipment no longer needs to be of highly corrosion-resistant construction.

Referring to FIG. 2, wherein like references characters indicate like parts as above, the evaporator 5 which may, for example, be a thin-film evaporator, is disposed in the discharge conduit 6 for the product solution. In addition, a feed line 11 is connected to the sump 4 in order to deliver the second solvent. By heating the product solution from the sump 4 via the evaporator 5, vapors of the second solvent can be generated and conveyed via the line 10 into the sump 4. In this way, the concentration of the product dissolved in the second solvent can be adjusted independently of the concentration of the product in the chlorination solution.

One example of a solvent exchange carried out in accordance with the process is as follows:

With the exchange column 1 constructed with a diameter of 70 millimeters and a height of 6 meters and filled with commercial packing bodies, a flow of chlorinated rubber chlorination solution with tetracholoromethane as the chlorination solvent is fed at a rate of 40 kilograms/hour into the head 3. This solution possibly contains chlorine and hydrogen chloride as impurities. The chlorinated rubber component of the solution is 10%. The head pressure of the column 1 is kept absolutely constant at about 0.3 bar by a vacuum pump (not shown).

Xylene is delivered as the second solvent and is evaporated in the evaporator 5 at a rate of about 21 kilograms/hour and is delivered into the sump 4 of the column 1. The output of the evaporator 5 is regulated, for example, so that a temperature of about 65° C. is maintained in the center of the column 1.

With the above parameters, a chlorinated rubber-zylene solution can be extracted at a rate of about 25 kilograms/hour from the sump 4. In this case, the solution has a polymer content, relative to the amount of solvent drawn off, of 16% and a residual impurity of about 0.05% $CCL_4$.

A condensed head product of $CCL_4$ is removed at a rate of about 36 kilograms/hour. This head product still contains about 0.2% xylene. In addition, the condensed head product still contains, as corrosive impurities about 1% chlorine and 0.8% hydrogen chloride.

The condensed head product can be returned into the chlorination installation (not shown) for the polymer while the bottom product from which the xylene has been extracted can be further processed in known manner, for example to a solid product or may be employed directly for the production of paint systems after being concentrated.

The invention thus provides a relatively simple process for removing chlorination solvent from a chlorinated aliphatic polymer using a solvent-exchange technique. Further, by using a continuously operating exchange column, the overall costs of the process can be reduced both in terms of expense and in terms of equipment.

What is claimed is:

1. A process for purifying a chlorinated aliphatic polymer of chlorination solvent comprising the steps of
   delivering a flow of chlorinated aliphatic polymer containing a chlorination solvent into a head of a continuously operating exchange column;
   delivering a flow of a second solvent having a higher boiling point than the chlorination solvent into a sump of the exchange column;
   performing a solvent exchange within the exchange column between a descending flow of the chlorinated aliphatic polymer and an ascending flow of the second solvent;
   extracting a solution of chlorinated aliphatic polymer in the second solvent from the sump of the exchange column; and
   removing the chlorination solvent from the head of the exchange column.

2. A process as set forth in claim 1 wherein said chlorinated rubber aliphatic polymer is a chlorinated rubber having tetrachloromethane chlorination solvent therein.

3. A process as set forth in claim 2 wherein the second solvent is xylene.

4. A process as set forth in claim 1 wherein the flow of chlorinated aliphatic polymer is delivered at a rate of 40 kilograms/hour, the flow of second solvent is delivered at a rate of 21 kilograms/hour and a solution of chlorinated aliphatic polymer in the second solvent is extracted at a rate of 25 kilograms/hour.

5. A process for removing chlorinated solvent from a chlorinated aliphatic polymer comprising the steps of
continuously contacting a descending flow of a chlorination solution containing chlorinated aliphatic polymer and a chlorination solvent with an ascending vaporous flow of a second solvent having a higher boiling point than the chlorination solvent within a continuously operating exchange column to effect a solvent exchange;
extracting a solution of chlorinated aliphatic polymer in the second solvent from a bottom of the exchange column; and
removing the chlorination solvent from a head of the exchange column.

6. A process as set forth in claim 5 wherein the descending flow is at a rate of 40 kilograms/hour, the ascending flow is at a rate of 21 kilograms/hour and the solution is extracted from the exchange column at a rate of 25 kilograms/hour.

7. A process as set forth in claim 1 which further comprises the steps of evaporating the second solvent to a vapor prior to delivery into the sump.

* * * * *